(12) United States Patent  (10) Patent No.: US 9,149,963 B2
Urushizaki et al.  (45) Date of Patent: Oct. 6, 2015

(54) INJECTION MOLDING MACHINE WITH ANTI-VIBRATION STRUCTURE FOR ELECTRIC POWER PANEL

(71) Applicant: FANUC CORPORATION, Minamitsuru-gun, Yamanashi (JP)

(72) Inventors: Tetsuharu Urushizaki, Yamanashi (JP); Hideki Koyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/020,352

(22) Filed: Sep. 6, 2013

(65) Prior Publication Data

US 2014/0072666 A1  Mar. 13, 2014

(30) Foreign Application Priority Data

Sep. 7, 2012 (JP) .................................. 2012-197671

(51) Int. Cl.
*B29C 45/17* (2006.01)

(52) U.S. Cl.
CPC ..... *B29C 45/1774* (2013.01); *B29C 2045/1797* (2013.01)

(58) Field of Classification Search
CPC ............ B29C 45/1774; B29C 45/1797; B29C 2045/7606
USPC ......................................................... 425/151
See application file for complete search history.

(56) References Cited

U.S. PATENT DOCUMENTS

| | | | | |
|---|---|---|---|---|
| 5,333,098 A | * | 7/1994 | DeLuca et al. | 361/679.34 |
| 5,676,459 A | * | 10/1997 | Bedford et al. | 362/390 |
| 5,843,487 A | * | 12/1998 | Boyd et al. | 425/190 |
| 5,900,260 A | * | 5/1999 | Hsu et al. | 425/532 |
| 6,030,200 A | * | 2/2000 | Ito et al. | 425/150 |
| RE36,682 E | * | 5/2000 | Carter, Jr. | 425/532 |
| 7,270,522 B2 | * | 9/2007 | Murthy et al. | 425/143 |
| 7,604,475 B2 | * | 10/2009 | Suga | 425/437 |
| 8,025,496 B2 | * | 9/2011 | Eikenberry | 425/169 |
| 2006/0159792 A1 | * | 7/2006 | Murthy et al. | 425/144 |

(Continued)

FOREIGN PATENT DOCUMENTS

| | | |
|---|---|---|
| CN | 101618587 A | 1/2010 |
| DE | 102010048658 A1 | 4/2012 |
| JP | 61154781 A | 7/1986 |

(Continued)

OTHER PUBLICATIONS

Decision to Grant a Patent mailed May 20, 2014, corresponds Japanese patent application No. 2012-197671.

(Continued)

*Primary Examiner* — Yogendra Gupta
*Assistant Examiner* — Emmanuel S Luk
(74) *Attorney, Agent, or Firm* — Hauptman Ham, LLP

(57) ABSTRACT

An electric power panel used in an injection molding machine is formed of a box-like member mounted with an electrical component. An electric power panel mounting member secured to a bottom portion of the electric power panel is attached to a floorboard by means of a vibration absorber. The electric power panel mounting member has a width greater than a width of the box-like member in a depth direction, and the vibration absorber is disposed on either end portion of the electric power panel mounting member outside the box-like member.

4 Claims, 9 Drawing Sheets

(56) References Cited

U.S. PATENT DOCUMENTS

2009/0280325 A1* 11/2009 Lozano et al. ................. 428/401
2010/0308504 A1* 12/2010 Ness et al. .................... 264/319

FOREIGN PATENT DOCUMENTS

| JP | 3272346 A | 12/1991 |
| JP | 5278071 A | 10/1993 |
| JP | 5318274 A | 12/1993 |
| JP | 2000185335 A | 7/2000 |
| JP | 2001-38785 A | 2/2001 |
| JP | 201012720 A | 1/2010 |

OTHER PUBLICATIONS

Office Action mailed Mar. 11, 2014, corresponds to Japanese patent application No. 2012-197671.

Office Action issued Mar. 10, 2015, corresponding to Chinese patent application No. 201310404371.1.

* cited by examiner

INJECTION MOLDING MACHINE WITH ANTI-VIBRATION STRUCTURE FOR ELECTRIC POWER PANEL

RELATED APPLICATIONS

The present application is based on, and claims priority from, Japanese Application Number 2012-197671, filed Sep. 7, 2012, the disclosure of which is hereby incorporated by reference herein in its entirety.

BACKGROUND OF THE INVENTION

1. Field of the Invention

The present invention relates to an injection molding machine, and more particularly, to an injection molding machine provided with an anti-vibration structure for an electric power panel.

2. Description of the Related Art

As shown in FIG. 11, an injection molding machine M has such a structure that a mold clamping mechanism section Mc and an injection mechanism section Mi are mounted on a base Mb and an electric power panel is accommodated in the base Mb. The electric power panel accommodated and secured in the base Mb is mounted with electrical components, such as a controller and control circuit of the injection molding machine M.

The injection molding machine M is designed to mass-produce molded products and requires reduction of the molding cycle time to improve productivity. In general, the cycle time is reduced by increasing the speed of a motor to achieve high acceleration-deceleration response. If mold opening/closing operation or resin injection operation is quickly performed with high response, therefore, vibration occurs in a mold opening/closing direction.

Japanese Patent Application Laid-Open No. 5-318274 discloses a system in which electrical components, such as a controller and control circuits of an injection molding machine, are mounted on an integral electric power panel and accommodated and secured in a base of the injection molding machine. This electric power panel comprises a duct section and a floorboard section, and principal electrical components are mounted on the duct section. Thus, vibrations generated in a mold clamping mechanism section and an injection mechanism section in each molding cycle are transmitted directly to the electronic components through the base and the electric power panel.

Japanese Patent Application Laid-Open No. 5-278071 discloses a structure in which an entire injection molding machine is supported by mounts that are attached to the underside of its base.

Further, Japanese Patent Application Laid-Open No. 2000-185335 discloses a structure in which electrical components of an injection molding machine are accommodated in an electric power panel, which is attached to a base of the injection molding machine with a vibration absorbing material therebetween. The vibration absorbing material, rubber, must be replaced, since it is believed to be degraded depending on or in proportion to the environmental temperature, amplitude of vibration, and repeat count and finally broken. Since the vibration absorbing material is disposed just below the electric power panel, however, it cannot be easily replaced if it is degraded and broken.

If the motor speed is increased to achieve high acceleration-deceleration response, in order to reduce the molding cycle time, vibration acceleration produced by the mold clamping mechanism section Mc and the injection mechanism section Mi increases and is transmitted to the electrical components on the electric power panel through the base Mb.

In the electrical components, including the controller and control circuits, mounted on the electric power panel, cracking of solder, loosening of connector fitting portions, etc., may occur, possibly resulting in a reduction in product life and hence breakdown, if vibration acceleration of an unallowable value repeatedly acts on the components. Accordingly, the vibration acceleration applied to the electrical components must be restricted to a predetermined value or less. If this is done, however, the motor speed and acceleration must inevitably be reduced, so that the cycle time cannot be reduced.

Vibration of the entire injection molding machine can be suppressed by replacing the mounts that support the injection molding machine with larger mounts with higher vibration absorption performance. There is a problem, however, that the larger mounts are more expensive and require larger-scale replacement work.

SUMMARY OF THE INVENTION

In view of the above-described problems of the prior art, the object of the present invention is to provide an electric power panel, comprising a vibration absorber for reducing adverse effects of vibration or shock on the electric power panel produced during a molding cycle and configured for easy replacement of the vibration absorber, and an injection molding machine provided with an anti-vibration structure for the electric power panel.

An electric power panel used in an injection molding machine according to the present invention comprises a box-like member mounted with an electrical component, an electric power panel mounting member secured to the box-like member, and a vibration absorber disposed between the electric power panel mounting member and a base of the injection molding machine. The electric power panel mounting member has a width greater than a width of the box-like member in a depth direction, and the vibration absorber is disposed on either end portion of the electric power panel mounting member outside the box-like member.

An injection molding machine according to the present invention comprises a mold clamping mechanism section and an injection mechanism section, which are provided on an upper part of a base, and an electric power panel comprising a box-like member mounted with an electrical component, and is configured so that an electric power panel mounting member secured to a bottom portion of the electric power panel is attached to a floorboard on the base with a vibration absorbing member therebetween and the electric power panel is disposed in the base. Further, the electric power panel mounting member has a width greater than a width of the box-like member in a depth direction, and the vibration absorber is disposed on either end portion of the electric power panel mounting member outside the box-like member.

The vibration absorber may comprise a vibration absorbing member and first and second fixing members attached to upper and lower parts, respectively, of the vibration absorbing member, and the first and second fixing members may be removably secured to the electric power panel mounting member and a supporting member, respectively.

According to the present invention, there may be provided an electric power panel, comprising a vibration absorber for reducing adverse effects of vibration or shock on the electric power panel produced during a molding cycle and configured for easy replacement of the vibration absorber, and an injection molding machine provided with an anti-vibration structure for the electric power panel.

BRIEF DESCRIPTION OF THE DRAWINGS

The above and other objects and features of the present invention will be obvious from the ensuing description of embodiments with reference to the accompanying drawings, in which.

DESCRIPTION OF THE PREFERRED EMBODIMENTS

Figure 1:
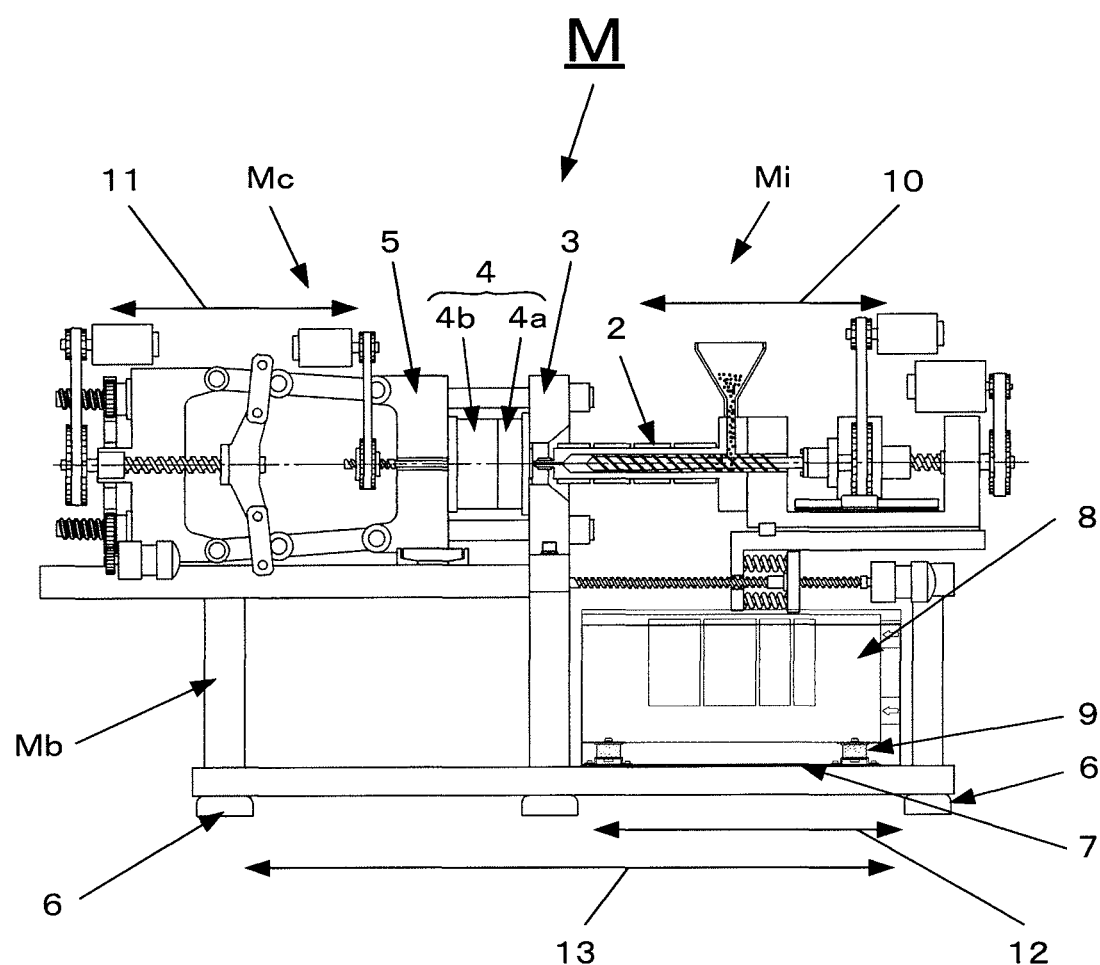
FIG. 1 is a side view showing one embodiment of an injection molding machine according to the present invention.
Figure 2:
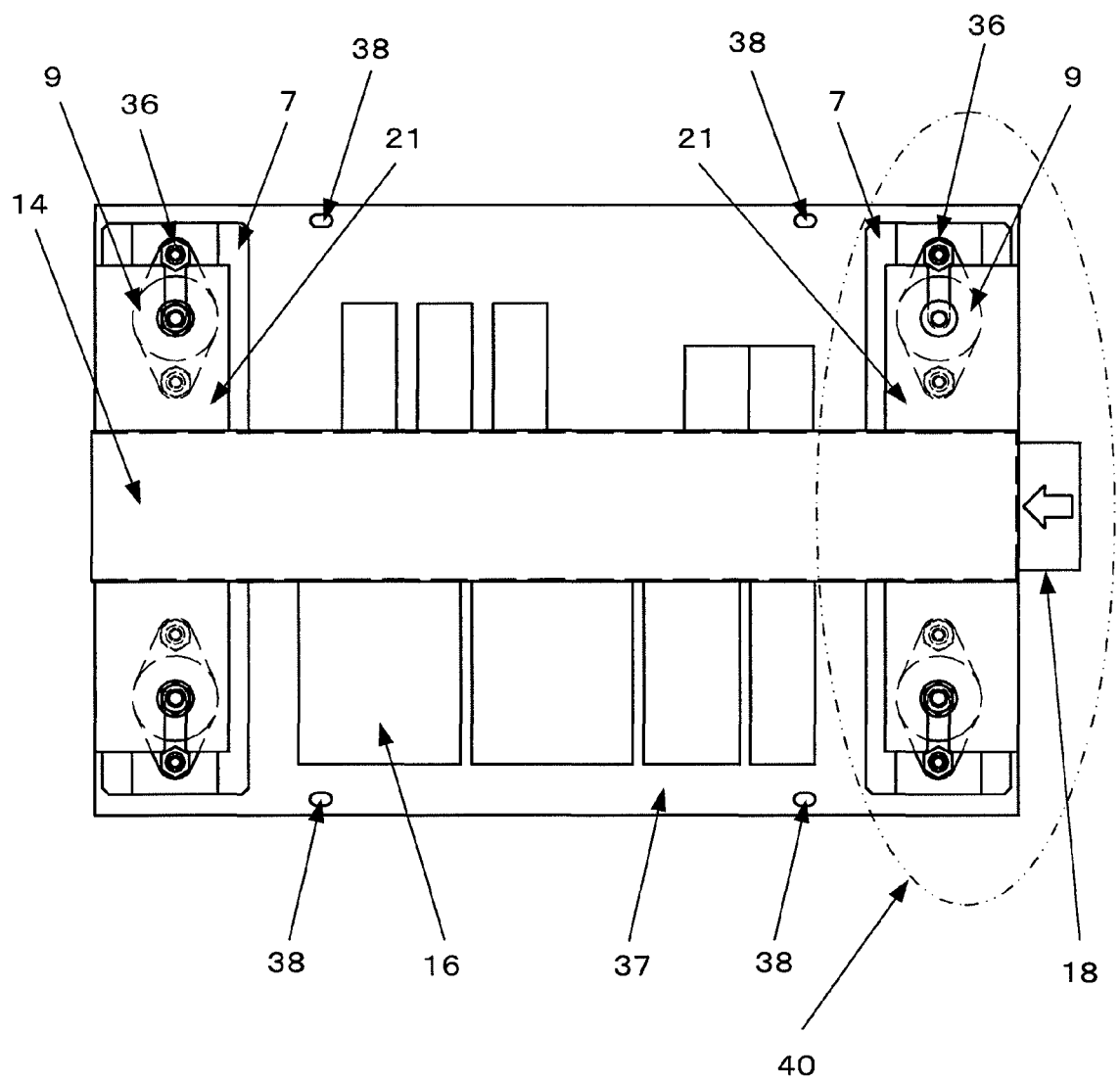
FIG. 2 is a top view of an electric power panel used in the injection molding machine of FIG. 1.
Figure 3:
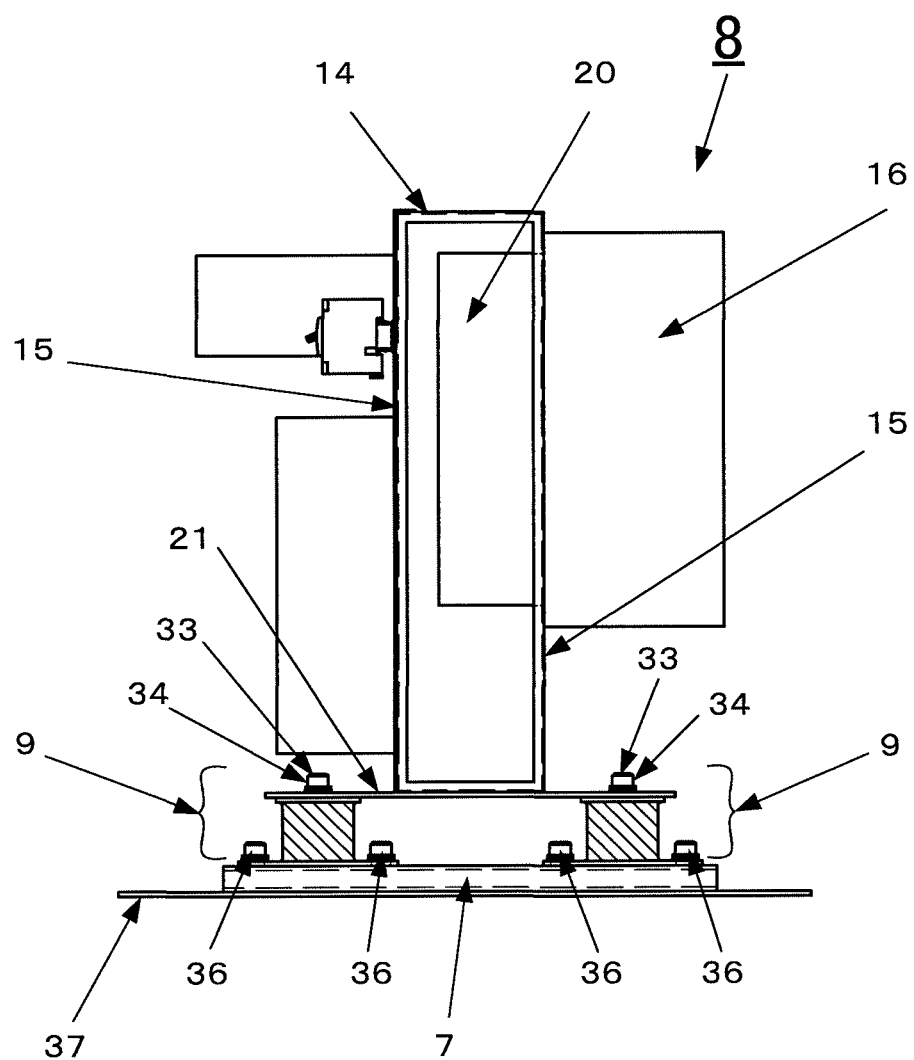
FIG. 3 is a left-hand side view of the electric power panel of FIG. 2.
Figure 4:
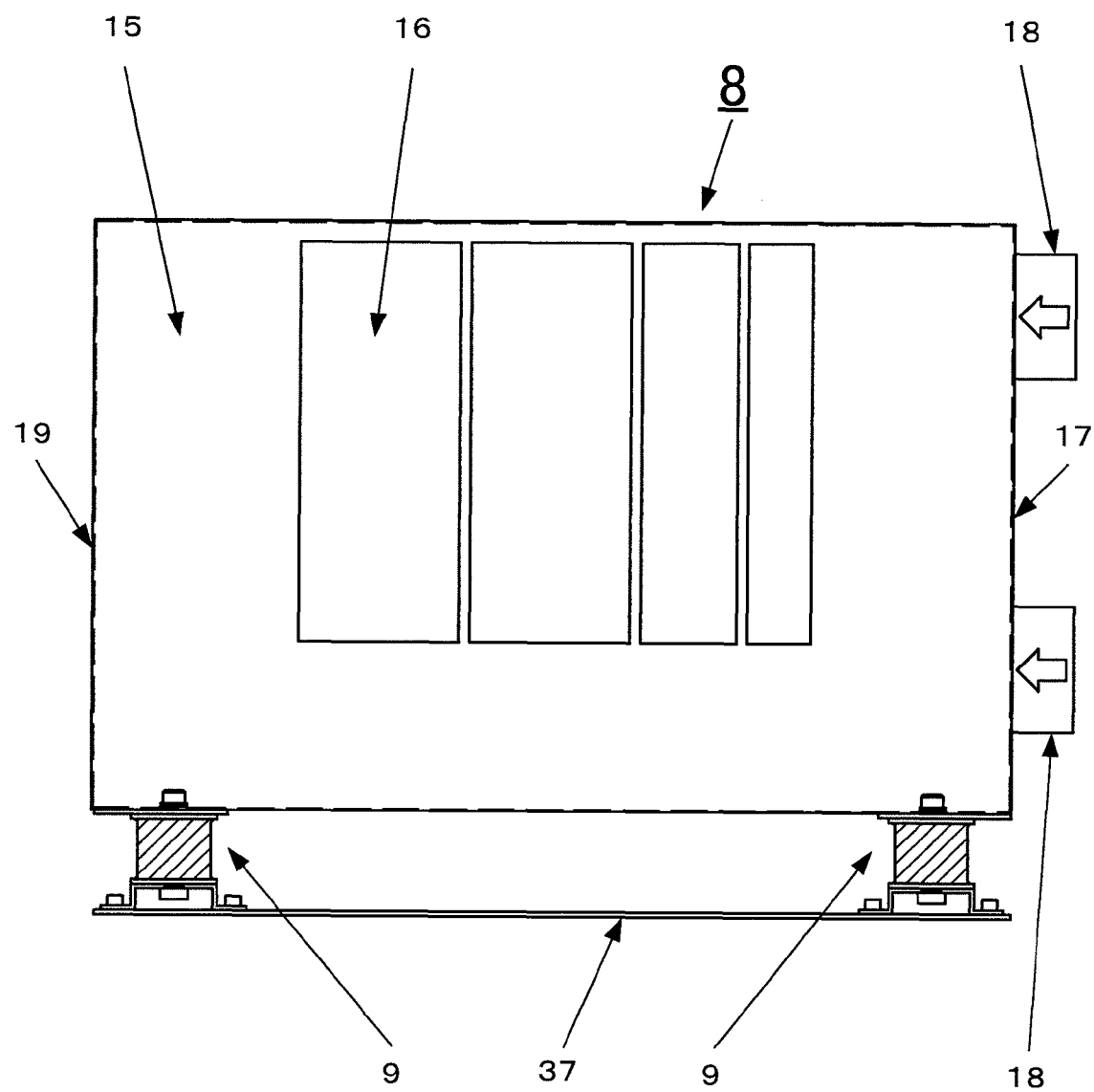
FIG. 4 is a front view of the electric power panel of FIG. 2.

One embodiment of an injection molding machine according to the present invention will be described with reference to FIG. 1.

An injection molding machine M is of a horizontal type, in which an injection mechanism section Mi and a mold clamping mechanism section Mc are mounted on a base Mb. A molten resin is injected from an injection cylinder 2 of the injection mechanism section Mi into a cavity, which is formed by bringing a stationary mold half 4a attached to a stationary platen 3 of the mold clamping mechanism section Mc and a movable mold half 4b attached to a movable platen 5 into close contact with each other.

In performing a molding cycle, the injection molding machine M is subjected to vibration or shock (vibration of mold clamping operation designated by numeral 11) generated during mold clamping operation (reciprocation of the movable platen 5) and vibration or shock (vibration of injection operation designated by numeral 10) generated during injection operation for injecting the molten resin from the injection cylinder 2. These vibrations or shocks are transmitted to the base Mb on which the injection mechanism section Mi and the mold clamping mechanism section Mc are mounted (base vibration designated by numeral 13).

In order to absorb the vibrations or shocks transmitted to the base Mb, the injection molding machine M is installed on a floor in a factory with mounts 6 attached to lower parts of the base Mb. Electrical components and controllers of the injection molding machine M are accommodated in an electric power panel 8, which is secured in the base Mb of the injection molding machine M by vibration absorbers 9.

The vibration absorbers 9, which serve to reduce transmission of vibration to the electric power panel 8 (vibration of the electric power panel designated by numeral 12), are secured to a floorboard 7 by fixing means such as bolts 36. The floorboard 7 is secured to a flat plate 37 by welding or fixing means such as bolts. The flat plate 37 is secured to the base Mb by bolts (not shown) that are passed through bolt holes 38, individually.

The electric power panel 8 will now be described with reference to FIGS. 2 to 7.

The electric power panel 8 has such a structure that electrical components 16, power supply unit, controller, etc., are attached to a box-like member, called a duct 14. The duct 14 is in the form of a hollow box. The electrical components 16, power supply unit, controller, etc., are attached to two opposite surfaces 15 of the duct 14, which extend parallel to the axial direction in which the injection mechanism section Mi and the mold clamping mechanism section Mc are arranged side by side. Further, cooling fans 18 are attached to a surface 17 perpendicular to the surfaces 15. Furthermore, an opening is provided on or bored in a surface 19 of the duct 14 opposite the surface 17. Air drawn in by the cooling fans 18 can be discharged from the duct 14 through the opening.

The electrical components, power supply unit, controller, etc., (hereinafter referred to collectively as the electrical components 16) attached to the duct 14 are provided with radiator fins 20. The electrical components 16 are attached to the duct 14 so that the radiator fins 20 are located in the duct 14. Heat generated by the electrical components 16 is released from the radiator fins 20, which are cooled by the cooling fans 18.

An electric power panel mounting member 21 of the electric power panel 8 is formed as a fixing metal plate, which is secured to a lower part of the duct 14 by fixing means such as bolts. The electric power panel 8 is secured to the floorboard 7 by interposing the vibration absorbers 9 between the electric power panel mounting member 21 and the floorboard 7. The flat plate 37 is secured to the base Mb, and the floorboard 7 to the flat plate 37.

Figure 5:
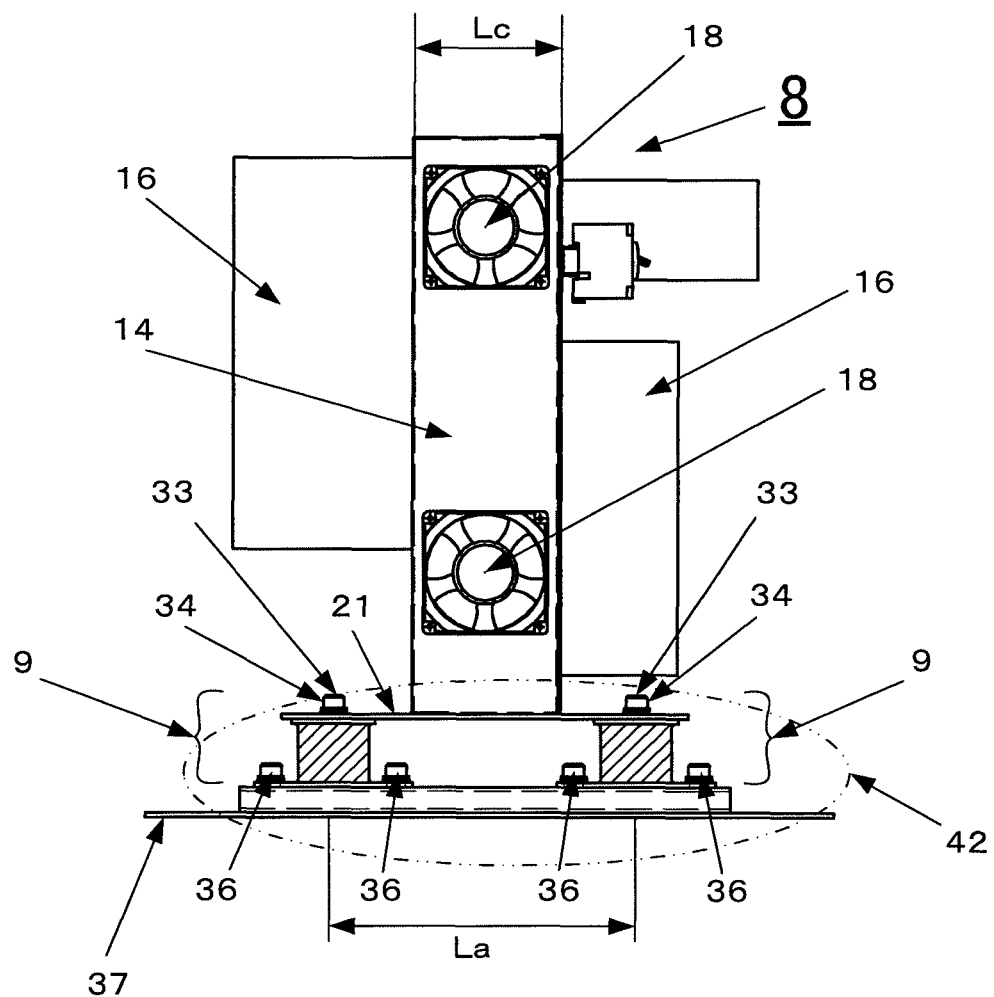
FIG. 5 is a right-hand side view of the electric power panel of FIG. 2.
Figure 6:
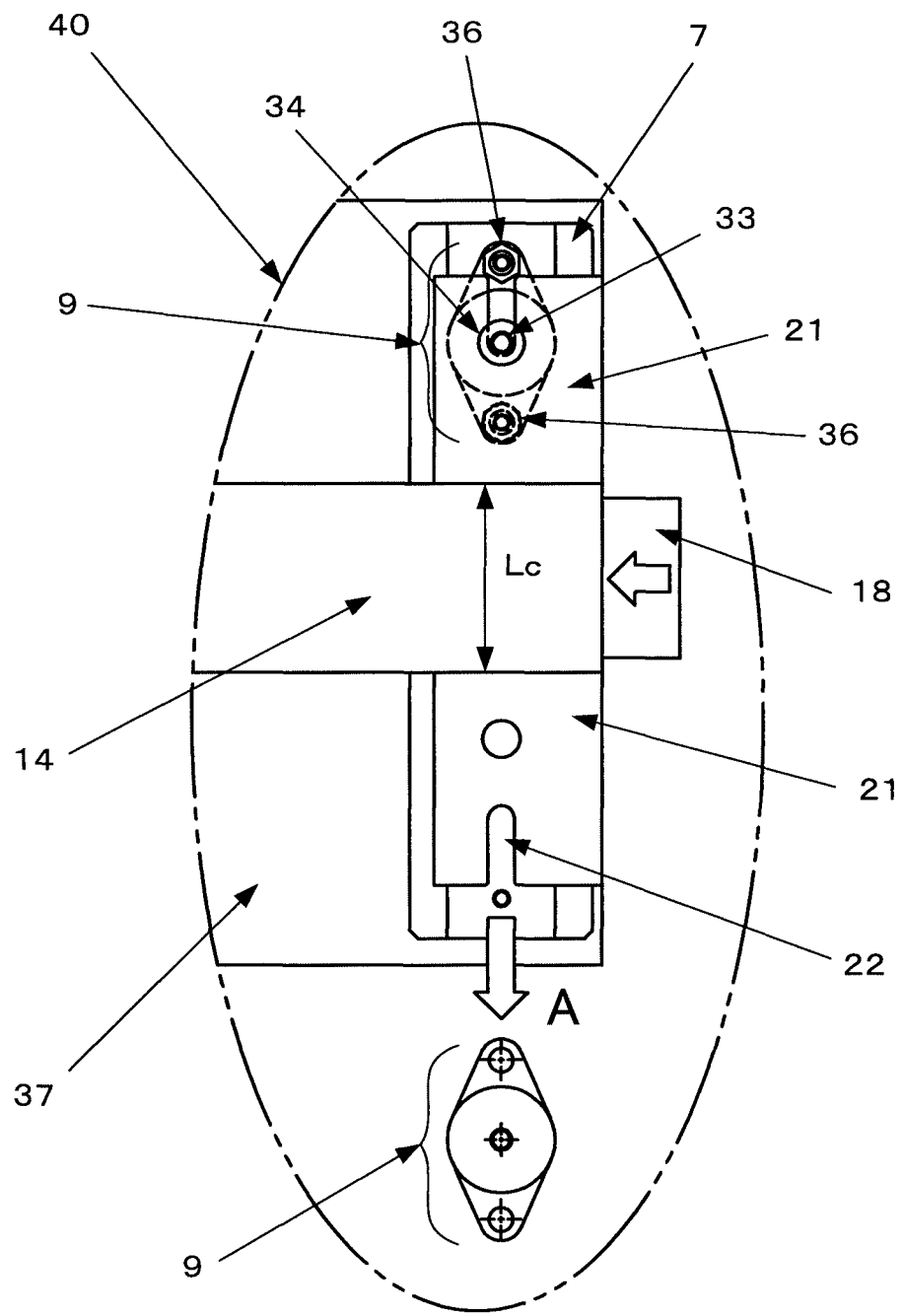
FIG. 6 is an enlarged view of a portion enclosed by a two-dot chain line 40 in FIG. 2.
Figure 7:
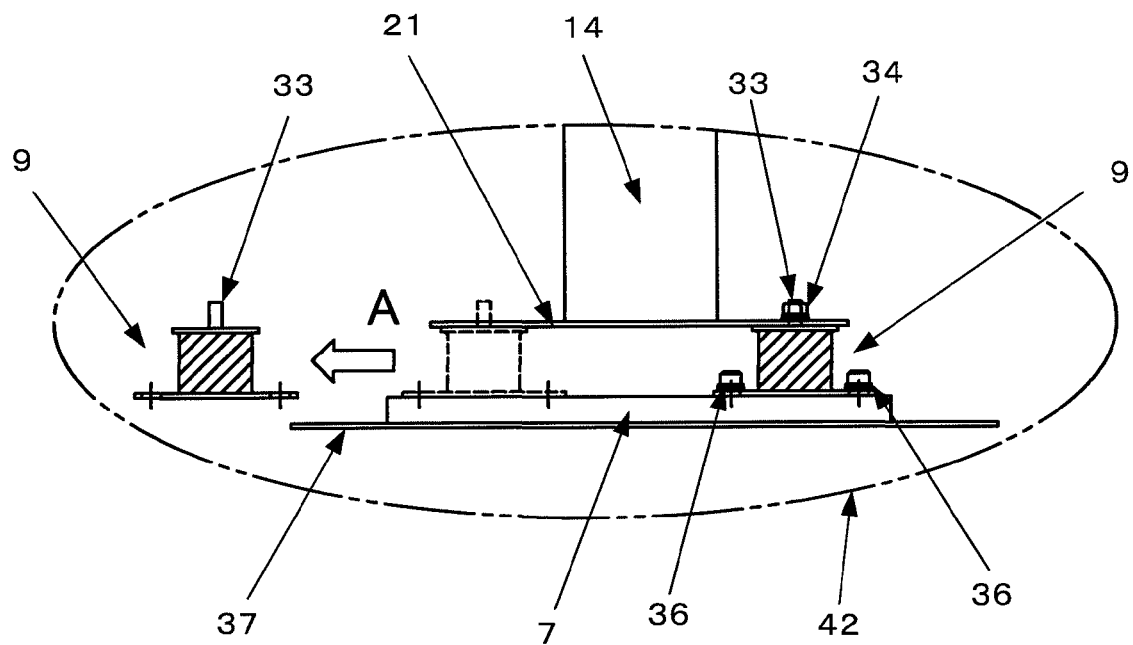
FIG. 7 is an enlarged view of a portion enclosed by a two-dot chain line 42 in FIG. 5.

As shown in FIG. 5, the longitudinal length (width) of the electric power panel mounting member 21 is longer than a width Lc of the duct 14 in the depth direction. As shown in FIG. 6, notches 22 are formed individually at the opposite end portions of the electric power panel mounting member 21 such that each vibration absorber 9 can be removed in the direction of arrow A of FIGS. 6 and 7 from the mounting member 21. As shown in FIG. 5, a distance La between the vibration absorbers 9 is made longer than the width Lc of the duct 14 so that the vibration absorbers 9 cannot be located just below the duct 14. In this state, the vibration absorbers 9 are secured to the electric power panel mounting member 21. In attaching each vibration absorber 9 to the mounting member 21, on the other hand, it is set opposite to the direction of arrow A of FIGS. 6 and 7. In this way, the vibration absorber 9 can be attached to and detached from the electric power panel mounting member 21 and the floorboard 7 without being hindered by the duct 14.

Figure 8:
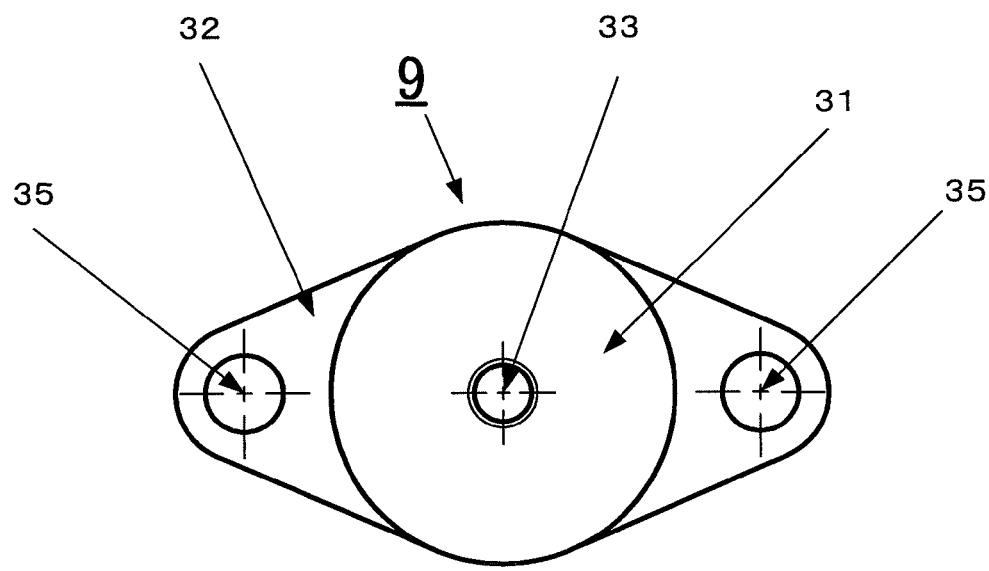
FIG. 8 is a top view of a vibration absorber used in the injection molding machine of FIG. 1.
Figure 9:
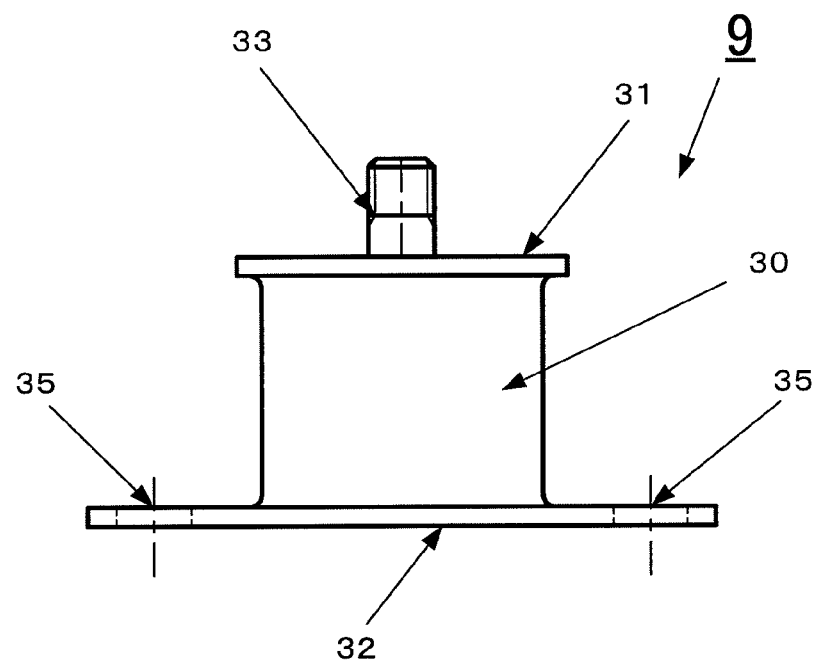
FIG. 9 is a plan view of the vibration absorber of FIG. 8.

One of the vibration absorbers 9 will now be described with reference to FIGS. 8 and 9.

The vibration absorber 9 comprises a rubber column 30 and upper and lower metal plates 31 and 32 bonded to the top and bottom, respectively, of the rubber column 30. The rubber column 30 is an elastic vibration absorbing member that can absorb vibration and shock. The upper and lower metal plates 31 and 32 serve as first and second fixing members, respectively. The upper and lower surfaces of the rubber column 30 are flat surfaces. The upper metal plate 31 is formed of a disk-like metal plate substantially equal in diameter to the rubber column 30 and a bolt 33 is secured to its central part. The lower metal plate 32 is formed of a substantially rhombic metal plate comprising a portion wider than the diameter of the rubber column 30, and is provided with bolt holes 35 in its extended opposite end portions. The bolts 36 are inserted into the bolt holes 35, individually.

The upper metal plate 31 of each vibration absorber 9 and the electric power panel mounting member 21 of the electric power panel 8 are fastened by the bolt 33 and a nut 34, and the lower metal plate 32 and the floorboard 7 secured to the base Mb are fastened by the bolts 36 inserted into the bolt holes 35. By doing this, the duct 14 of the electric power panel 8 is coupled to the floorboard 7 by the vibration absorber 9. In some cases, the lower metal plate 32 of the vibration absorber 9 may be secured to the flat plate 37 or a constituent member of the base Mb. In this way, the vibration absorber 9 may be alternatively supported on the base Mb, flat plate 37, or floorboard 7, depending on the structure of the injection molding machine M.

Thus, vibrations generated by the mold clamping and injection operations for each molding cycle can be transmitted up to the floorboard 7 of the base Mb that is fastened to the electric power panel 8. Nevertheless, vibration acceleration transmitted to the electrical components 16 of the electric power panel 8 can be reduced by the effect of the vibration absorbers 9. Even if the speeds of motors attached to the injection mechanism section Mi and the mold clamping mechanism section Mc are increased to achieve high acceleration-deceleration response, therefore, the vibration acceleration applied to the electrical components 16 of the electric power panel 8 can be restricted to a predetermined value or less, so that the cycle time can be reduced.

Figure 10:
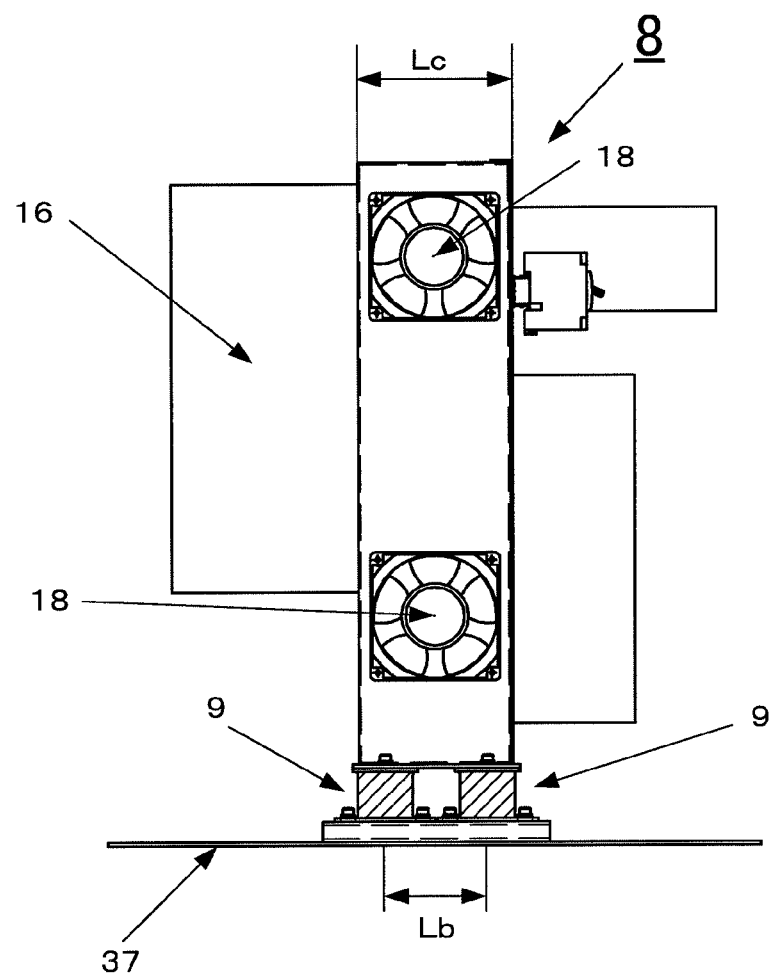
FIG. 10 is a right-hand side view of the electric power panel in which vibration absorbing members are disposed just below a duct, for illustration for comparison with the electric power panel shown in FIG. 5 (in which vibration absorbers are disposed outside the duct)
Figure 11:
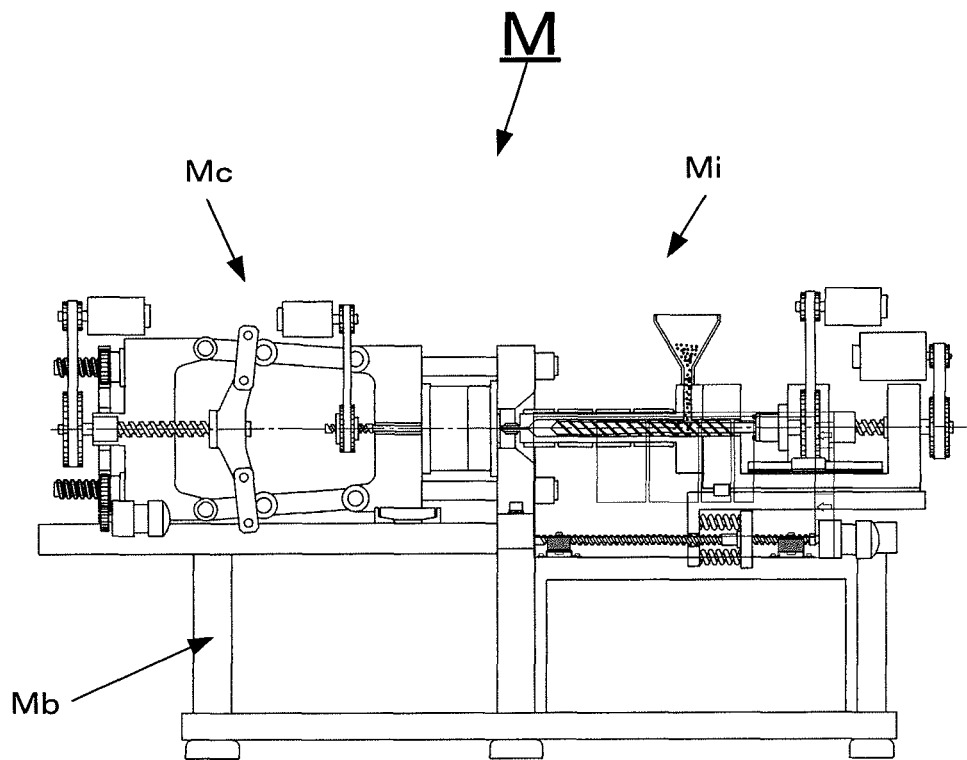
FIG. 11 is a view illustrating a conventional injection molding machine in which an electric power panel is accommodated in a base mounted with a mold clamping mechanism section and an injection mechanism section.

According to the present invention, as compared with the method in which the mounts 6 of the injection molding machine M are replaced with larger mounts to suppress vibration of the entire injection molding machine M, the electric power panel 8 is set in the injection molding machine M by means of the vibration absorbers 9, as a result, it is possible to suppress vibrations of the electric power panel 8 by means of small and inexpensive vibration absorbers 9 which can be easily replaced with other. However, if the vibration absorbers 9 are disposed just below the duct 14 of the electric power panel 8 so that a distance Lb between them is shorter than the width Lc of the duct 14, as shown in FIG. 10, the duct 14 is liable to roll and become unstable.

Since the rubber columns 30 of the vibration absorbers 9 may possibly be cracked and broken by aging degradation, moreover, replacement of the vibration absorbers 9 should be taken into consideration. However, if the vibration absorbers 9 are disposed just below the duct 14 of the electric power panel 8, as shown in FIG. 10, bolt fastening portions of the vibration absorbers 9 are located inside the duct 14. Therefore, very hard work is needed to draw out the electric power panel 8 from the base Mb, disassemble the duct 14, and replace the vibration absorbers 9. To attain this, the electric power panel mounting member 21 for use as a fixing member is configured to be secured to the lower part of the duct 14 so that the vibration absorbers 9 can be located at positions corresponding to the opposite end portions of the mounting member 21 outside the width of the duct 14, as shown in FIG. 5.

As the distance La between the vibration absorbers 9 is made longer than the width Lc of the duct 14, rolling of the electric power panel 8 can be prevented to ensure stability. Since the vibration absorbers 9 are disposed not inside (or just below) but outside the duct 14, as shown in FIG. 5, moreover, the nuts 34 and the bolts 36 can be easily removed, and the vibration absorbers 9 themselves can be drawn out sideways (see arrow A of FIGS. 6 and 7).

Thus, the vibration absorbers 9 can be easily replaced with new ones without removing the main body portion of the electric power panel 8 from the base Mb of the injection molding machine M. The box-like member may be either a structure that is open at the longitudinally opposite ends thereof, such as the duct 14, or a structure closed at both ends. Further, a frame-like member may be used for the electric power panel mounting member 21. The fixing member may be made of any other material than a metal only if it can maintain sufficient strength.

The invention claimed is:

1. An electric power panel for an injection molding machine including a mold clamping mechanism section and an injection mechanism section disposed on a base, the electric power panel comprising:
   a box-like member mounted with an electrical component;
   a cooling fan;
   an electric power panel mounting member secured to the box-like member on a bottom of the box-like member; and
   a vibration absorber disposed between the electric power panel mounting member and the base of the injection molding machine, wherein
   the box-like member has an opening or bored portion through which air drawn in by the cooling fan in a longitudinal direction of the box-like member is discharged from an inside of the box-like member, and
   in a side view along the longitudinal direction of the box-like member,
      the electric power panel mounting member has a width greater than a width of the box-like member, and
      the vibration absorber is disposed on either end portion of the electric power panel mounting member and outside the width of the box-like member.

2. The electric power panel according to claim 1, wherein the vibration absorber comprises a vibration absorbing member and first and second fixing members attached to upper and lower parts, respectively, of the vibration absorbing member, and
   the first and second fixing members are removably secured to the electric power panel mounting member and a supporting member, respectively.

3. An injection molding machine, comprising:
   a base,
   a floorboard on the base,
   a mold clamping mechanism section and an injection mechanism section, which are provided on an upper part of the base, and
   an electric power panel disposed on the base and comprising
      a box-like member mounted with an electrical component,
      a cooling fan, and
      an electric power panel mounting member secured to a bottom portion of the electric power panel and attached to the floorboard, and
      a vibration absorbing member disposed between the electric power panel mounting member and the floorboard, wherein
   the box-like member has an opening or bored portion through which air drawn in by the cooling fan in a longitudinal direction of the box-like member is discharged from an inside of the box-like member, and in a side view along the longitudinal direction of the box-like member,
the electric power panel mounting member has a width greater than a width of the box-like member, and
the vibration absorber is disposed on either end portion of the electric power panel mounting member and outside the width of the box-like member.

4. The injection molding machine according to claim 3, wherein
the vibration absorber comprises a vibration absorbing member and first and second fixing members attached to upper and lower parts, respectively, of the vibration absorbing member, and
the first and second fixing members are removably secured to the electric power panel mounting member and a supporting member, respectively.

* * * * *